(12) United States Patent
Oz

(10) Patent No.: US 8,068,516 B1
(45) Date of Patent: Nov. 29, 2011

(54) METHOD AND SYSTEM FOR EXCHANGING MEDIA AND DATA BETWEEN MULTIPLE CLIENTS AND A CENTRAL ENTITY

(75) Inventor: Ran M. Oz, Modiin (IL)

(73) Assignee: Bigband Networks, Inc., Redwood City, CA (US)

( * ) Notice: Subject to any disclaimer, the term of this patent is extended or adjusted under 35 U.S.C. 154(b) by 899 days.

(21) Appl. No.: 11/055,507

(22) Filed: Feb. 9, 2005

Related U.S. Application Data

(63) Continuation of application No. 10/872,006, filed on Jun. 17, 2004, now abandoned.

(60) Provisional application No. 60/479,618, filed on Jun. 17, 2003.

(51) Int. Cl.
*H04J 3/06* (2006.01)
*G06F 1/12* (2006.01)
*H04L 5/00* (2006.01)
*H04N 7/167* (2011.01)
*H04N 7/173* (2011.01)

(52) U.S. Cl. .......... 370/517; 370/509; 725/31; 725/111; 713/401

(58) Field of Classification Search .......... 370/486, 370/487, 503, 509, 517, 522; 725/31, 105, 725/111; 380/204, 221; 713/400, 401
See application file for complete search history.

(56) References Cited

U.S. PATENT DOCUMENTS

| | | | |
|---|---|---|---|
| 5,870,474 A * | 2/1999 | Wasilewski et al. .......... | 380/211 |
| 6,243,369 B1 * | 6/2001 | Grimwood et al. .......... | 370/335 |
| 6,353,604 B2 * | 3/2002 | Grimwood et al. .......... | 370/335 |
| 6,466,986 B1 * | 10/2002 | Sawyer et al. .......... | 709/245 |
| 6,580,730 B1 * | 6/2003 | Loukianov .......... | 370/522 |
| 6,594,305 B1 * | 7/2003 | Roeck et al. .......... | 375/222 |
| 6,742,187 B1 * | 5/2004 | Vogel .......... | 725/126 |
| 6,791,995 B1 * | 9/2004 | Azenkot et al. .......... | 370/436 |
| 6,956,865 B1 * | 10/2005 | Khaunte et al. .......... | 370/442 |
| 6,965,616 B1 * | 11/2005 | Quigley et al. .......... | 370/480 |
| 6,975,652 B1 * | 12/2005 | Mannette et al. .......... | 370/503 |
| 6,996,129 B2 * | 2/2006 | Krause et al. .......... | 370/487 |
| 7,023,882 B2 * | 4/2006 | Woodward et al. .......... | 370/487 |
| 7,028,204 B2 * | 4/2006 | Jammes et al. .......... | 713/400 |
| 7,058,802 B1 * | 6/2006 | Epstein et al. .......... | 713/150 |
| 7,085,287 B1 * | 8/2006 | Chapman .......... | 370/468 |
| 7,113,484 B1 * | 9/2006 | Chapman et al. .......... | 370/252 |
| 7,114,070 B1 * | 9/2006 | Willming et al. .......... | 713/156 |
| 7,184,408 B2 * | 2/2007 | Denton et al. .......... | 370/244 |
| 7,194,009 B2 * | 3/2007 | Eng .......... | 370/480 |
| 7,209,442 B1 * | 4/2007 | Chapman .......... | 370/235 |
| 7,242,773 B2 * | 7/2007 | Candelore .......... | 380/240 |

(Continued)

*Primary Examiner* — Ayaz Sheikh
*Assistant Examiner* — Hoang-Chuong Vu
(74) *Attorney, Agent, or Firm* — Reches Patents

(57) ABSTRACT

The invention provides a system and a method for synchronizing cable modems, the method includes the stages of: (i) generating, at a media access control entity, synchronization messages; and (ii) updating the synchronization messages to provide updated synchronization messages, whereas the updating is responsive to delays introduced at least during a stage of multiplexing the updated synchronization messages and additional content. The invention provides a system and a method of encrypting a data stream, the method includes the stages of: (i) receiving, at a multiplexing entity, at least one data stream destined to at least one cable modem; (ii) receiving, at the multiplexing entity, at least one encryption key generated by a cable modem termination system, whereas each encryption key is associated with at least one cable modem; and (iii) encrypting at least one data stream with at least one encryption key associated with the at least one cable modem.

32 Claims, 8 Drawing Sheets

U.S. PATENT DOCUMENTS

| | | | |
|---|---|---|---|
| 7,289,680 B1 * | 10/2007 | Tse et al. | 382/251 |
| 2001/0055319 A1 * | 12/2001 | Quigley et al. | 370/480 |
| 2002/0131403 A1 * | 9/2002 | Desai et al. | 370/352 |
| 2003/0014763 A1 * | 1/2003 | Chappell et al. | 725/111 |
| 2003/0105637 A1 * | 6/2003 | Rodriguez et al. | 704/270 |
| 2003/0108199 A1 * | 6/2003 | Pinder et al. | 380/200 |
| 2003/0115612 A1 * | 6/2003 | Mao et al. | 725/136 |
| 2003/0149991 A1 * | 8/2003 | Reidhead et al. | 725/119 |
| 2003/0235195 A1 * | 12/2003 | Shenoy et al. | 370/389 |
| 2004/0045032 A1 * | 3/2004 | Cummings et al. | 725/111 |
| 2004/0093494 A1 * | 5/2004 | Nishimoto et al. | 713/165 |
| 2004/0163124 A1 * | 8/2004 | Basawapatna et al. | 725/117 |
| 2004/0181800 A1 * | 9/2004 | Rakib et al. | 725/25 |
| 2004/0181811 A1 * | 9/2004 | Rakib | 725/122 |
| 2004/0190544 A1 * | 9/2004 | Azenko et al. | 370/442 |
| 2004/0234074 A1 * | 11/2004 | Sprunk | 380/28 |
| 2006/0269285 A1 * | 11/2006 | Farmer et al. | 398/72 |

* cited by examiner

| TS packet 311 | TS packet 312 | TS packet 313 | TS packet 314 | TS packet 315 | TS packet 316 | TS packet 317 | Protocol ID 320 | Bit Rate 322 | Datagram counter 324 |

FIGURE 4

| MESSAGE TYPE 332 | VALIDITY 334 | SEQUENCE NUMBER 336 | MAC ADDRESS 338 | ENCRYPTION KEY 340 | REMAINING KEY LIFETIME 342 | CBC IV 344 | CHECKSUM 346 | Bit Rate 322 | Datagram counter 324 |
|---|---|---|---|---|---|---|---|---|---|

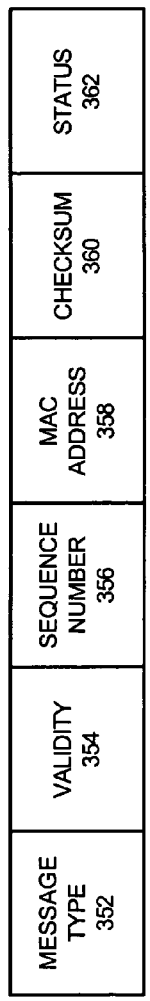
FIGURE 6

METHOD AND SYSTEM FOR EXCHANGING MEDIA AND DATA BETWEEN MULTIPLE CLIENTS AND A CENTRAL ENTITY

RELATED APPLICATIONS

This application is a Continuation of U.S. patent application Ser. No. 10/872,006, filed Jun. 17, 2004, now abandoned entitled "Method and System for Exchanging Media and Data Between Multiple Clients and A Central Entity" and U.S. Provisional Patent Application No. 60/479,618, filed 17 Jun. 2003, entitled "Sharing One CMTS on A Few QAMs". This patent application is hereby incorporated by reference in its entirety.

FIELD OF THE INVENTION

The present invention relates to communication systems and especially to methods and systems for exchanging information and applying media access control schemes in a cable modem and set-top box environment.

BACKGROUND OF THE INVENTION

Information signals, such as data signals, media signals and especially compressed video and audio streams and more especially packetized audio and media streams propagate over various communication channels, such as but not limited to terrestrial, wireless, satellite, wireline and cable communication channels. Media streams usually include large amounts of information.

Digital transmission and compression techniques allow for transmitting media signals over communication channels in a compressed form. The Moving Pictures Experts Group (MPEG) specifications are standardized methods for compressing and transmitting media signals such as video and audio.

Communication channels that are connected to clients have a limited bandwidth, said limitation is known in the art as the "last mile problem". Accordingly, only a certain amount of services can be provided to clients over said limited bandwidth channels. The amount of services is especially limited when some of them are bandwidth consuming.

It is noted that certain bandwidth limited networks are known in the art as broadband networks, but said title mostly emphasizes the much larger bandwidth these communication networks have (usually about 750 Mhz) in comparison to even more bandwidth limited communication networks and technologies, such as Plain Old Telephone Networks, dial-in modems and the like.

Clients are grouped in service groups. A service group includes a plurality of clients, such as set top boxes, cable modems and the like, that receive the same multiplexed downstream signal ('downstream' means from service provided to a client, while 'upstream' means information transmitted from the clients) as they share the same communication link/output port of a node, hub or even a Headend. A service group is also known in the art as a "forward carrier path".

Typically, media packets are provided to Headends, primary hubs, secondary hubs and nodes and then are transmitted over communication networks to the clients. Some media packets can pass through more than one entity out of said Headend, hubs and nodes. In order to transmit the media packets over said networks they are modulated in various manners known in the art.

The modulation is implemented by modulators that may be located within said entities. A typical modulator is a Quadrature Amplitude Modulation (QAM) modulator, although other modulators, such as QPSK modulators, are known in the art. QPSK modulation is more robust than QAM modulation but is slower. It is noted that QPSK modulation may be used for modulating upstream information.

A QAM modulator usually receives input signals and outputs a modulated signal over a Radio Frequency carrier. Usually said modulator is also able to perform additional processing steps such as encryption, error correction coding, interleaving and the like. Most QAM modulators are able to alter the carrier frequency within a predefined frequency range. The modulators are arranged in arrays that are also known in the art as multi-modulators. Multi-modulators provide multiple modulated output signals. Modulated signals that are spaced apart in the frequency domain can be combined. Typically, each modulator outputs an output channel that has a bandwidth of 6 Mhz. The 6 Mhz channel can be used to convey a single analog television channel or ten MPEG compliant television channels. Typically, downstream channels are in the 50-750 Mhz band while upstream channels are in the 5-40 Mhz band.

Data is conveyed over various networks, including the Hybrid Cable Fiber (HFC) networks. A well known cable modem transmission standard is known as DOCSIS (Data Over Cable Service Interface Specification). Cable Modem Termination System (CMTS) are known in the art. They can be used for DOCSIS compliant systems.

A CMTS is usually installed in a cable headend or in a distribution hub and is connected to multiple cable modems via the HFC network. A conventional CMTS board transmits downstream information on a single downstream channel to multiple cable modems and receives information from multiple cable modems over one or more upstream channel. The upstream channel is usually termed out of band channel, as upstream transmission usually occupies a frequency range outside of the downstream frequency range.

The DOCSIS reference model includes a backbone network that is connected to a CMTS via a backbone transport adapter that in turn is also connected to a local server facility and a Telco Return Access Concentrator (TRAC). The TRAC is connected to a plain old telephone network. The CMTS is connected to data over cable security system DOCSS that enables data stream encryption. The CMTS is also connected to an operations support system and to a downstream combiner and upstream splitter that in turn are connected to a transmitter and to a receiver. The combiner can also be connected to video sources. These transmitter and receiver are connected to a hybrid fiber cable coax network that is connected to cable modems. The cable modems can be connected to client premises equipment. The CMTS is modeled as a network terminator that is connected to a modulator for downstream transmission and also connected to a de-modulator for upstream reception. DOCSIS is aimed to forward IP traffic transparently over a system that may be modeled by the mentioned above model.

There are various DOCSIS standards. The DOCSIS 1.0 is aimed to allow Internet access service to clients. DOCSIS 1.1 also supports telephony services. DOCSIS 2.0 adds the ability to use higher upstream data rates. The DOCSIS has a U.S version and a European version that is also referred to as EURO-DOCSIS. One of the differences between these versions is the allocation of 6 Mhz wide channel in the U.S. and the allocation of 8 Mhz wide channels in Europe.

There are various models of communication protocols. A first well-known model is the OSI model that includes seven layers, starting from the physical layer (layer 1), data link layer (layer 2), network layer (layer 3), transport layer (layer 4), session layer (layer 5), presentation layer (layer 6) and application layer (layer 7).

A slightly different model describes the TCP/IP protocol suit that includes four layers such as the network interface layer, internet layer, the transport layer and the application layer. The network interface layer defines a standard interface for various low level layers. The internet layer provides routing and relaying functions for carrying packets of data from a source system to a destination system through an internet. This layer includes the Internet Protocol (IP), the Reverse Address Resolution Protocol, the Internet Control Message Protocol (ICMP) and the Address Resolution Protocol (ARP) that maps between logical network layer addresses (such as IP address) and hardware, data link Media Access Control (MAC) layer addresses. The transport layer provides an end-to-end data delivery service that is used to exchange messages over the internet, by application processes. This layer includes either the simple User Datagram Protocol (UDP) or the more complex but more reliable Transfer Control Protocol (TCP). The application layer includes many protocols that are aimed to provide a variety of services to network units. It includes, for example, the SNMP network management protocol, the TFTP file transfer protocol, the DHCP protocol that assigns IP address to devices, and the like.

CMTS and CM communicate using a multi-layered protocol stack that can be mapped to the TCP/IP protocol suit. When the CMs and CMTS operate as IP and LLC hosts the application layer includes SNMP, TFTP and DHCP protocols, the transport layer includes a UDP protocol, the internet layer includes IP, ARP and ICMP protocols, and the network interface layer include a variety of protocols and sub-layers starting from a Physical Media Dependent (PMD) sub-layer protocol, a Transmission convergence sub-layer (for downstream transmission only), a Media Access Control sub-layer, a link security sub-layer, and a Logical Link Control (LLC)/DIX/sub-layer. DIX is the Ethernet version 2.0 standard. In this context, DIX link layer framing refers to the "Type interpretation" of the Length/Type filed in ISO8802-3.

The transmission convergence layer defines a downstream data-conveying packet that has the same size and the same header format as the 188 byte long MPEG Transport packet (a.k.a. transport stream packet). Thus allowing both data and Video to be demodulated at the same manner and to facilitate common receiving hardware. A typical downstream MAC frame may includes MAC header and an optional variable length Ethernet type Packet Data Protocol Data Unit (PDU). This downstream MAC frame is preceded by a MPEG transmission convergence header. A typical upstream MAC frame is preceded by a PMD header.

The CMTS manages the upstream transmission by applying a media access control (MAC) scheme and allocating time slots and mini-time slots for upstream transmission. A single MAC sub-layer domain includes upstream and downstream channels for which a single Media Access Control Allocation and management protocol operates. One or more CMTS usually manage multiple MAC sub-layer domains. CMTS can support various quality of service classes by associating one of more service flow ID to each cable modem.

In order to effectively utilize the upstream bandwidth there is a need to synchronize the cable modems clocks as well as to assess the upstream delay from each cable modem to the CMTS. The CMTS generates and transmits SYNC messages that include a timestamp representative of when the SYNC message left the CMTS. The various upstream and downstream delays are determined during a ranging session that each cable modem undergoes before gaining access to the upstream channel. The cable modems receive the SYNC messages and synchronize their clock accordingly. A method for such synchronization by a cable modem is described at U.S. Pat. No. 6,698,022 of Wu titled "Time-stamp-based timing recovery for cable media access controller" which is incorporated herein by reference.

Another important MAC message is the Upstream Channel Descriptor (UCD) message that is used to number and to attribute mini-slots. A typical CMTS grant allows a certain cable modem to upstream transmit during a certain number of mini-slots, starting from a certain mini-slot.

The CMTS is also capable of determining the service group of each cable modem. This determination can be utilized by sending ping messages. A system, apparatus and computer readable medium that utilize ping messages in described at U.S. Pat. No. 6,594,305 of Roeck et al. titled "Media access layer ping protocol for diagnosing cable modem links", which is incorporated herein by reference.

Various networks that include CMTS and can convey data according to DOCSIS are known in the art. The following patents and patent applications, all incorporated herein by reference, provide a brief overview of state of the art systems and methods: U.S. Pat. No. 6,711,135 of Dziekan et al., titled "HFC access network management system"; U.S. patent application 20030058887 of Dworkin et al., titled "Method and apparatus for ineterleaving DOCSIS data with an MPEG video stream"; U.S. patent application 20040019876 of Dravida et al., titled "Network architecture for intelligent network elements"; U.S. patent application 20040045035 of Cummings et al., titled "Distributed cable modem termination system (CMTS) architecture".

DOCSIS compliant systems encrypt downstream data. One of the reasons for said encryption is the downstream transmission of data to multiple cable modems that share the same downstream channel. The security scheme is known as Baseline Privacy Interface (for DOCSIS version 1.0) or BPI+ (for DOCSIS version 1.1). This scheme includes using an encryption key of limited time duration to encrypt data being sent to cable modems. A cable modem is responsible to request a new encryption key once a current encryption key expires or nearly expires. BPI+ provides an improved scheme that uses a certificate based authentication such that a cable modem binds his MAC address to his RSA public key. The CMTS can verify the public key of the cable modem by verifying the authenticity of the certificate.

A brief overview of a BPI encryption scheme is illustrated in U.S patent application serial number 20030061623 of Denney et al., titled "Highly integrated media access control" which is incorporated herein by reference.

SUMMARY OF THE PRESENT INVENTION

The invention provides a method for synchronizing cable modems, the method includes the stages of: (i) generating, at a media access control device, synchronization messages; and (ii) updating the synchronization messages to provide updated synchronization messages, whereas said updating is responsive to delays introduced at least during a stage of multiplexing the updated synchronization messages and additional content.

The invention provides a method of encrypting a data stream, the method includes the stages of: (i) receiving, at a multiplexing entity, at least one data stream destined to at least one cable modem; (ii) receiving, at the multiplexing entity, at least one encryption key generated by a cable modem termination system, whereas each encryption key is associated with at least one cable modem; and (iii) encrypting at least one data stream with at least one encryption key associated with the at least one cable modem.

The invention provides a system for encrypting a data stream, the system includes: (i) an encryption key generator, adapted to generate at least one encryption key, whereas each encryption key is associated with at least one cable modem; and (ii) a multiplexing device, adapted to receive at least one data stream destined to at least one cable modem and to receive the at least one encryption key, and to encrypt at least one data stream with at least one encryption key associated with the at least one cable modem.

The invention provides a system for synchronizing cable modems, the system includes a media access control device, configured to generate synchronization messages; and a multiplexing device, configured to multiplex additional content with updates synchronization messages and to update the synchronization messages, whereas said update is responsive to delays introduced at least during the multiplex.

The invention provides a computer readable medium having code embodied therein for causing an electronic device to perform the stages of: (i) generating, at a media access control entity, synchronization messages; and (ii) updating the synchronization messages to provide updated synchronization messages, whereas said updating is responsive to variations in the delays introduced at least during a stage of multiplexing the updated synchronization messages and additional content.

The invention provides a computer readable medium having code embodied therein for causing an electronic device to perform the stages of: (i) receiving, at a multiplexing entity, at least one data stream destined to at least one cable modem; (ii) receiving, at the multiplexing entity, at least one encryption key generated by a cable modem termination system, whereas each encryption key is associated with at least one cable modem; and (iii) encrypting at least one data stream with at least one encryption key associated with the at least one cable modem.

BRIEF DESCRIPTION OF THE DRAWINGS

The present invention will be understood and appreciated more fully from the following detailed description taken in conjunction with the drawings in which:

FIG. 4 illustrates a typical sequence of signals transmitted from the cable modem termination system, in accordance to an embodiment of the invention;

FIG. 5 illustrates an encryption key provision message, in accordance to an embodiment of the invention;

FIG. 6 illustrates a key acknowledgment message, in accordance to an embodiment of the invention;

DETAILED DESCRIPTION OF PREFERRED EMBODIMENTS

The following are definitions, which are used throughout the description of the disclosed technique:

DVB/ASI and DHEI are examples for digital video (MPEG) transmission specifications. The disclosed technique provides examples, which include DVB/ASI modules. It is noted that equivalent modules, such as DHEI modules, and the like, can replace these DVB/ASI modules.

MPEG denotes a family of media (especially video and audio) decoding and multiplexing specifications where ISO/IEC 11172 is also called MPEG-1 and the ISO/IEC 13818 is also called MPEG-2.

The term "entity" or "unit" refers to hardware, software, middleware or a combination of two or more of said three that can perform predefined functions. All the figures are out of scale and different boxes can describe different entities, remotely positioned entities and even entities that are integrated into each other.

The term "multiplexing entity" or "processing and multiplexing entity" refer to an entity that has multiplexing capabilities and can even have additional processing capabilities that can allow that entity to perform various tasks such as updating synchronization messages. These entities can also, but not necessarily, perform at least one of the following tasks: media stream rate shaping, compressing, encrypting, and the like.

The invention provides a system and method in which network layer operations are separated from MAC layer operations. Thus, a first entity such as but not limited to the CMTS performs MAC layer operations while another entity, such as a processing and multiplexing entity (PME) performs network layer operations.

The inventors found that such a separation has various advantages, as the CMTS can handle more cable modems, while the PME is more suited to perform various network layer operations.

In at least some prior art systems and methods the CMTS performances were limited by its relatively limited network layer capabilities. By increasing the amount of cable modems the CMTS can manage, a more cost effective method and system are provided, especially due to the relatively high cost of applying the MAC layer operations.

The inventors found out that by sharing one or more QAM modulators between various applications, including data transfer and media transfer, a better utilization of the QAMs bandwidth is achieved.

For simplicity of explanation it is assumed that the MAC layer operations include sending synchronization messages to various cable modems, but this is not necessarily so.

Figure 1:
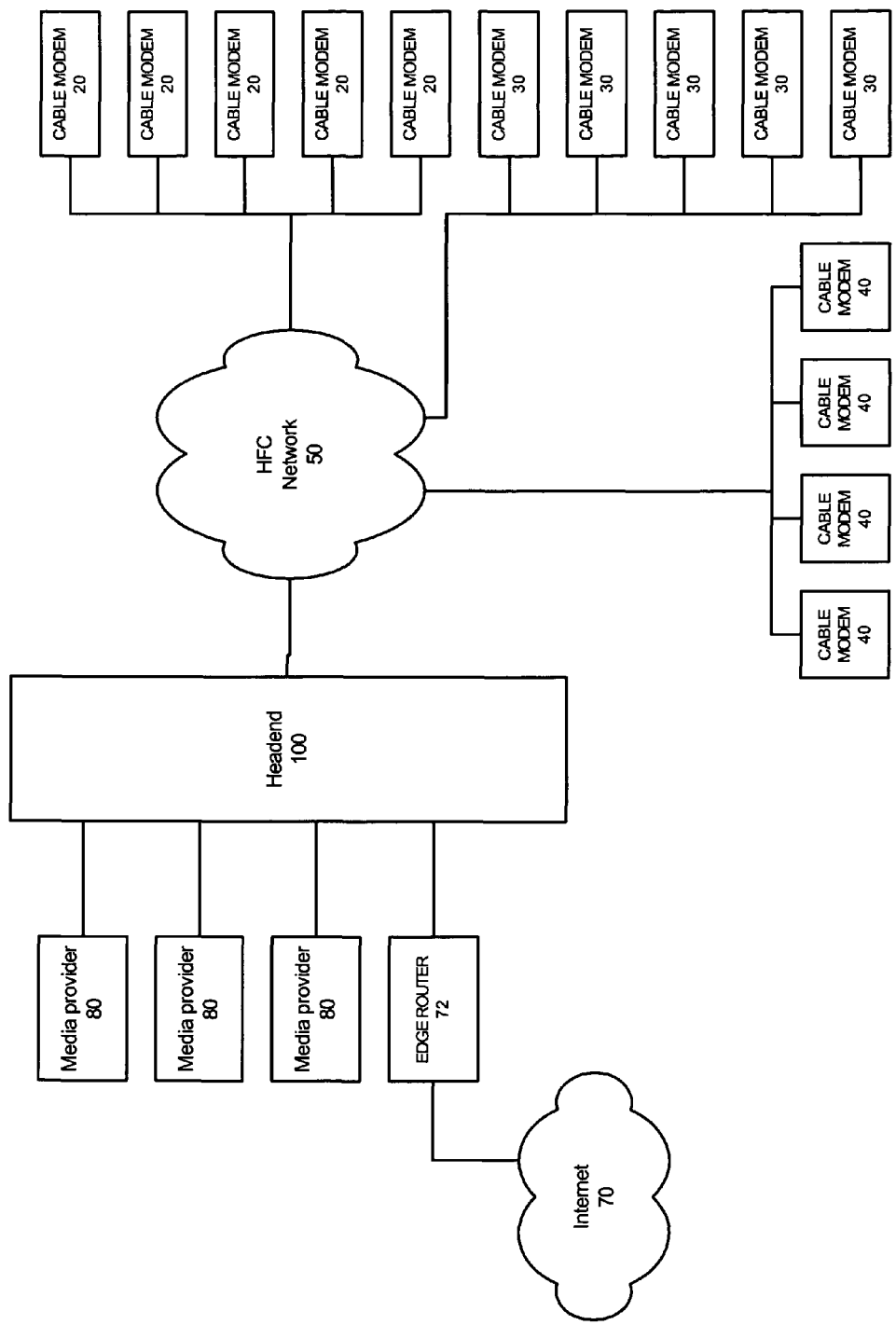
FIG. 1 illustrates a central entity that is connected over a network to multiple cable modems, in accordance to an embodiment of the invention.

FIG. 1 is a simplified view of an environment 10 that includes multiple cable modems 20, 30 and 40, an access network such as HFC network 50, a Headend 100, a backbone network 70 and media providers 80.

For simplicity of explanation it is assumed that the backbone network 70 is the Internet, that the Internet is connected to the Headend 100 via an edge router 72, that the media providers 80 provide MPEG compliant media streams and that the transmission of data is DOCSIS compliant. The media providers may include Video On demand servers, near Video On Demand servers, live media providers and the like. It is further assumed that the HFC conveys downstream QAM modulated information.

Those of skill in the art will appreciate that other configurations, as well as other communication protocols, other standards and data formats can be utilized without departing from the scope of the invention. For example the media access control unit can be a component of a distribution hub.

It is further noted that the environment can include various local and central distribution hubs, that other networks than the HFC network can be used for interconnecting the Headend 100 and multiple end-users devices. It is also noted that a single cable modem can be connected to multiple devices having multiple IP and MAC addresses, and the devices other than cable modems can be used for receiving and transmitting data.

The cable modems 20, 30 and 40 are grouped in three groups. They can share either the same or different upstream and downstream channels. It is assumed that each group has a unique upstream and downstream channel. It is noted that the amount of cable modems that are connected to a single Headend 100 usually includes hundreds and even thousands, but for simplicity of explanation only three groups of cable modems are illustrated. It is further noted that if all cable modems share the same downstream channels that media access control messages are broadcast to all these cable modems.

Figure 2:
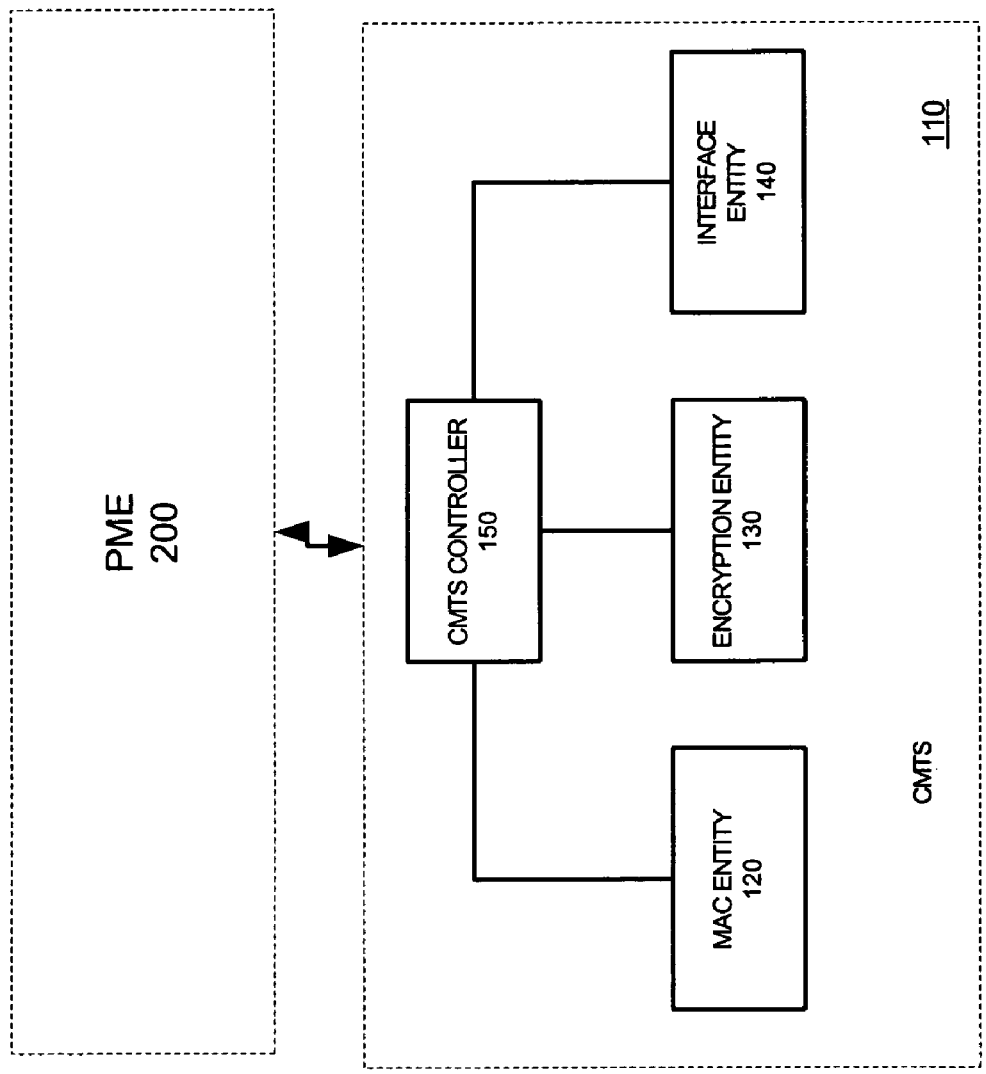
FIG. 2 illustrates the central entity, in accordance to an embodiment of the invention.

FIG. 2 illustrates in greater details Headend 100, according to an embodiment of the invention.

Headend 100 includes a CMTS 110 that in turn includes a media access control (MAC) entity 120, an encryption key generator 130, as well as an interface entity 140 and controller 150. Each entity can include software as well as hardware components but this is not necessarily so. CMTSs are known in the art and their structure as well as functionality requires no additional explanation.

Headend 100 further includes a processing and multiplexing entity (PME) 200 that is capable of receiving one or more media streams and one or more data streams, as well as media access control messages from CMTS 110, and provide one or more QAM modulated multiplexed streams to a HFC network. PME 200 may be capable of compressing at least some of the received media streams and to force various network policy and rules.

According to an embodiment of the invention the PME 200 is the Broadband Multimedia System (BMS) described at U.S. Pat. No. 6,434,141 of Oz et al., titled "communication management system and method", which is incorporated herein by reference. The processing and multiplexing entity can also be the broadband multimedia system described as U.S. patent application Ser. No. 09/595,624 filed at 16 Jun. 2000, titled "Method for delivery of narrow-cast data over digital broadcast channels" of Oz et al. It is noted that according to other embodiments of the invention other processing and multiplexing entities, including entities with less or more functionality than these BMS can be utilized. The PME 200 has to be capable of multiplexing data packets as well as MAC messages conveying packets with additional content conveying packets. The PME has to be capable of performing multiplexing as well as compensating for delays introduced by the multiplexing process or by the network.

CMTS 110 can be a prior art CMTS but it is configured to send encryption keys and associated information to the PME 200 and also does not include a QAM modulator, but rather is connected to one or more QAM modulators.

CMTS 110 can use various well-known MAC schemes for allocating upstream bandwidth to each cable modes that share the same upstream channel. Typically, the CMTS receives transmission requests from the cable modems and in response sends MAP messages that include grants that allow certain cable modems to upstream transmit during one or more consecutive mini-slots. The MAC messages typically include SYNC messages, UCP messages, MAP messages and encryption related messages.

Figure 3:
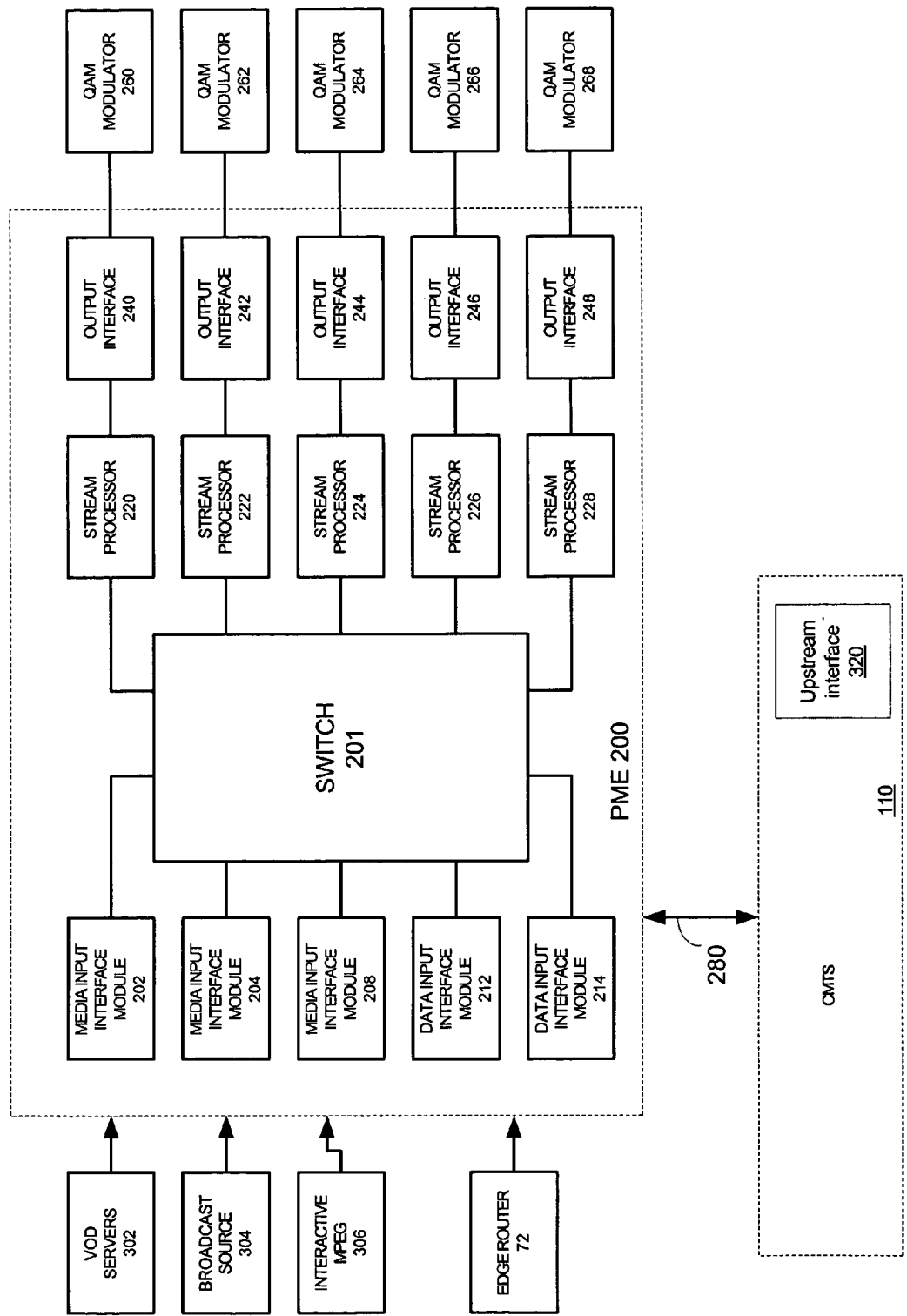
FIG. 3 further illustrates a multiplexing and processing entity, according to an embodiment of the invention.

FIG. 3 further illustrates PME 200, according to an embodiment of the invention. It is noted that other configurations of PME can be applied and that the number of illustrated modules is for illustration only.

PME 200 has multiple input ports for receiving at least one data stream from at least one data source. Typically, the PME 200 has multiple ports and can be connected to multiple data and media sources, such as Video On Demand servers 302, broadcast source 304, interactive MPEG source 306 and edge router 72. PME 200 is also connected to various modules such as Media Access Control unit 310, encryption unit 320 and an upstream interface 320 that in turn can be a part of CMTS 110.

PME 200 includes media input interface modules 202-208, data input interface modules 212-214, a core switch 201, stream processors 220-228, and output interfaces 240-248. The stream processors 220-228 are capable of processing media streams as well as data streams. They can, for example, perform media stream compression, multiplexing, encryption, SYNC re-stamping, MPEG re-mapping and the like. The output interfaces can provide DVB/ASI as well Ethernet functionality and can also be configured to provide an interface according to other standards or methods.

According to other embodiments of the invention PME 200 can include input interface units that are capable of receiving both data and media streams, PME 200 can include stream processors that are capable of processing either data or media, and PME 200 can also include output interfaces that can be adapted to manage either data of media.

PME 200 receives data packets destined to various cable modems. These data packets are sent to one or more QAM, such as QAM modulators 260-268 that are connected to multiple cable modems via downstream channels. Conveniently, the PME 200 is aware of a mapping between cable modems and QAM modulators and can send data packets as well as media access control information according to the mapping. According to another, less bandwidth effective, embodiment of the invention the media access control messages are broadcast by multiple QAMs.

According to an embodiment of the invention the PME 200 can determine the mapping between cable modems and QAMs by various well known methods, but this is not necessarily so. Typically, a ping message is sent to a certain cable modem via a certain QAM modulator. If a proper response message from the cable modem is received PME 200 can map that cable modem to that QAM modulator. Else, another ping message is sent via another QAM modulator. A PING response is transmitted upstream and will pass through CMTS 110 before arriving to the PME 200.

CMTS 110 sends all downstream messages, such as media access control messages, to the cable modems, through PME 200. Some of the messages, and especially SYNC messages, are altered by the PME 200. Other media control access messages include UCD messages, MAP messages and the like.

CMTS 110 is capable of receiving upstream transmissions from cable modems, for example by upstream interface 320, and send at least a portion of these transmissions to the edge router 72 either directly or via PME 200. The CMTS 110 may select not to send all upstream messages to PME 200 or to edge router 72. For example, requests for upstream bandwidth allocation from a cable modem to the CMTS are not usually transmitted by the CMTS 110 to other entities.

The CMTS 110 and PME 200 can communicate in different well known manners, utilizing prior art communication protocols. It is assumed the CMTS 110 transmits Transport Stream packets as well as additional metadata over UDP/IP datagrams.

FIG. 4 illustrates a typical sequence of signals transmitted from the CMTS 110 to PME 200. This sequence can be used for example if CMTS 110 and PME 200 interact over a UDP/IP connection. The sequence 300 starts by a seven 188- byte long transport stream packets 311-317 that convey data to be downstream transmitted to the cable modems. These packets are followed by a 2-byte long protocol ID field 320 that identifies the data transmission protocol, such as DOCSIS v.2. This latter field is followed by a 4-byte long bit rate field 322 that reflects the Constant Bit Rate of the seven TS packets 311-317. Field 322 is followed by a 4-byte long field 324 denoted "datagram counter" that is incremented each time a datagram is sent from the CMTS 110 to entity 200. This assists in tracking lost datagrams. The last field 324 is a set of seven 1-bit long flags that indicate if the transport stream packets 311-317 include a SYNC message and if so, in which packet.

Encryption of data streams is done in response to sequence numbers assigned to upstream and downstream data streams.

FIG. 5 illustrates an encryption key provision message 330. Message 330 starts by a 2-byte long message type field 332 that identifies the type of message. A certain value indicates that the message is a key. Field 332 is followed by a 1-byte long key validity field 334, a sequence number field 336, a MAC address field 338, encryption key field 340, key remaining lifetime field 342, CBC IV field 344 and checksum field 346.

The CMTS assigns a different sequence number (field 336) to each encryption session. An encryption session can end once an encryption key expires or if the CMTS determines to stop the encryption for other reasons. In order to assign different sequence number to different cable modems, the CMTS can utilize a counter that is incremented after a key was successfully generated for a certain sequence. The validity field 334, as well as the sequence number field 336, can indicate how to end an encryption session. The validity filed is set if a new encryption key is sent to the cable modem. If the validity field is reset and the sequence number is equal to an existing sequence number then the encryption is stopped immediately, else the encryption shall end once the current encryption key expires. The CMTS may decide that once an encryption key that is associated with a certain MAC address expires and a new key was not assigned to that MAC address to stop provisioning data to that address, to send an error message and the like.

The remaining lifetime of a certain encryption key is indicated in field 342. The MAC address field 338 includes the MAC address of one or more cable modems that should receive data that is encrypted by the encryption key within field 340.

FIG. 6 illustrates a key acknowledgment message 350 sent by the PME 200 to the CMTS 110 once an encryption provision message 330 was received. This message includes a 2-byte long message type field 352 that identifies the type of message. A certain value indicates that the message is a key acknowledgment message. Field 352 is followed by a 1-byte long key validity field 354 which is reflects the value of the corresponding validity field 334, a sequence number field 356 that reflects the sequence number field 336, a 6-byte long MAC address field 358 which reflects the MAC address field 338, a checksum field 360 that reflects the result of a checksum operation that was applied on message 330 and status field 362 that can represent various errors in the corresponding message 330. For example, the status can include a wrong sequence number, a sequence number that equals a previously assigned sequence number, a checksum error, and the like.

In a typical scenario a cable modem, such as cable modem 20 requests the CMTS 110 to receive a new encryption key. The request usually occurs before a current encryption key associated with that cable modem expires. The request is received by CMTS 110 that in turn generates an encryption key and sends a message such as encryption key provision message 330 to PME 200. PME 200 acknowledges that such a key was receives and sends a key acknowledgment message 350 to CMTS 110. In addition, the key should be sent to cable modem 20 according to normal practice. If this request and acknowledgment are valid then the data sent to that cable modem can be encrypted by the encryption key. Else, CMTS 110 can re-send message 330 or generate a new key and send an appropriate message to PME 200.

PME 200 can apply various rate shaping schemes as well as bandwidth allocation schemes for optimizing the usage of the downstream bandwidth. For example, it can compress media streams.

Figure 7:
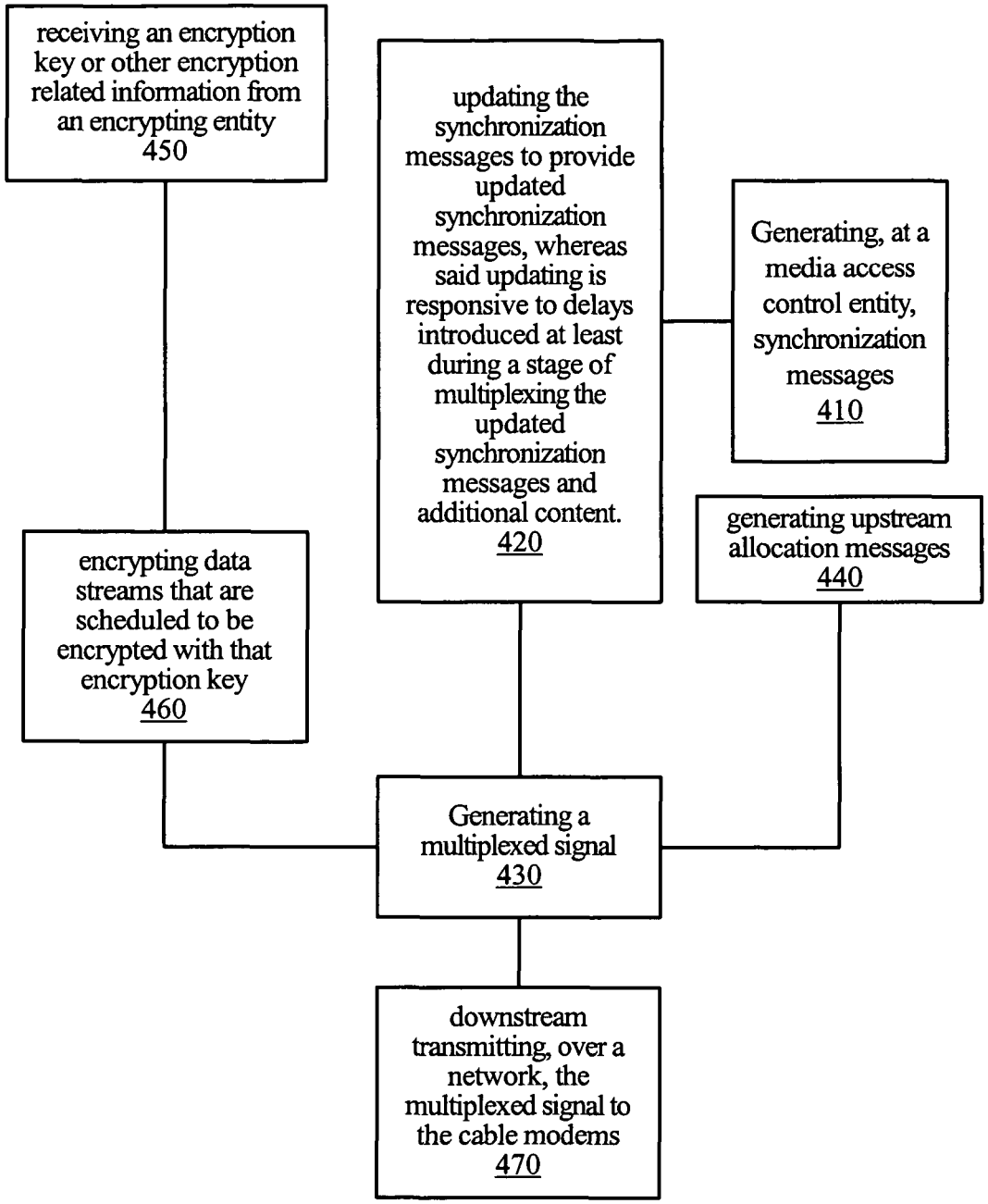
FIG. 7 illustrates a flow chart of a method for synchronizing cable modems, according to an embodiment of the invention.

FIG. 7 illustrates a flow chart of method 400 for synchronizing cable modems, according to an embodiment of the invention. Method 400 starts by stage 410 of generating, at a media access control entity, synchronization messages. Referring to the example of FIG. 3, a SYNC message is generated by MAC entity 310.

Stage 410 is followed by stage 420 of updating the synchronization messages to provide updated synchronization messages, whereas said updating is responsive to delays introduced at least during stage 430 of multiplexing the updated synchronization messages and additional content. Referring to FIG. 3, PME 200 can receive the SYNC message. This message is sent to one or more QAM modulators that are connected to all the cable modems that should be synchronized. The SYNC message can be received by data input interface 212 or 214 and sent across the switch 201 to one or more stream processors. Each stream processor is capable of receiving multiple data and media packets and multiplex them to provide a multiplexed stream. The multiplexing of packets within PME 200, as well as additional temporary storage and retrieval staged, introduce a delay in the transmission of SYNC packets, the delay is not known to the CMTS 110, and its variation is compensated by the PME 200 which modifies the timestamps included within the SYNC messages. The delay may be measured by various well known delay compensation schemes. A first scheme can include associating each SYNC with a first PME time stamp, once a SYNC message is received by the PME, and associating a second time stamp, representative of the actual transmission time towards a QAM, after the timing of such transmission is known. A stream processor may evaluate the transmission period in view of the status of its queues. A difference between the second and first PME timestamps can be added to the SYNC timestamp. It is noted that a single PME timestamp can be used if the PME and the CMTS are synchronized to each other.

Stage 420 is followed by stage 430 of generating the multiplexed signal. The multiplexed signal may include the updated synchronization messages and additional content. The additional content may include media streams, other media access unit messages (for example, UCP messages, MAP messages), encrypted data streams and the like. The encrypted data streams are generated during stage 450 of receiving an encryption key or other encryption related information from an encrypting entity and stage 460 of encrypting data streams that are associated with that encryption key.

Stage 430 is followed by stage 470 of downstream transmitting, over a network, a multiplexed signal to the cable modems. Referring to FIG. 3 the transmission may include QAM modulation before a Radio Frequency signal is sent over a HFC network towards a cable modem. The cable modems usually synchronize themselves after receiving such an updated synchronization message.

Stage 440 can be further explained in reference to FIG. 3. CMTS 110 can generate MAP messages and send them, via PME 200, towards cable modems. CMTS 110 is capable to maintain a first MAC sub-layer domain for cable modems 20, a second MAC sub-layer domain for cable modems 30 and a third MAC sub-layer domain for cable modems 40. It is noted that the CMTS 110 and not the PME 200 maintaining these sub-layers by applying various MAC schemes and sending appropriate MAC massages to the cable modems.

Figure 8:
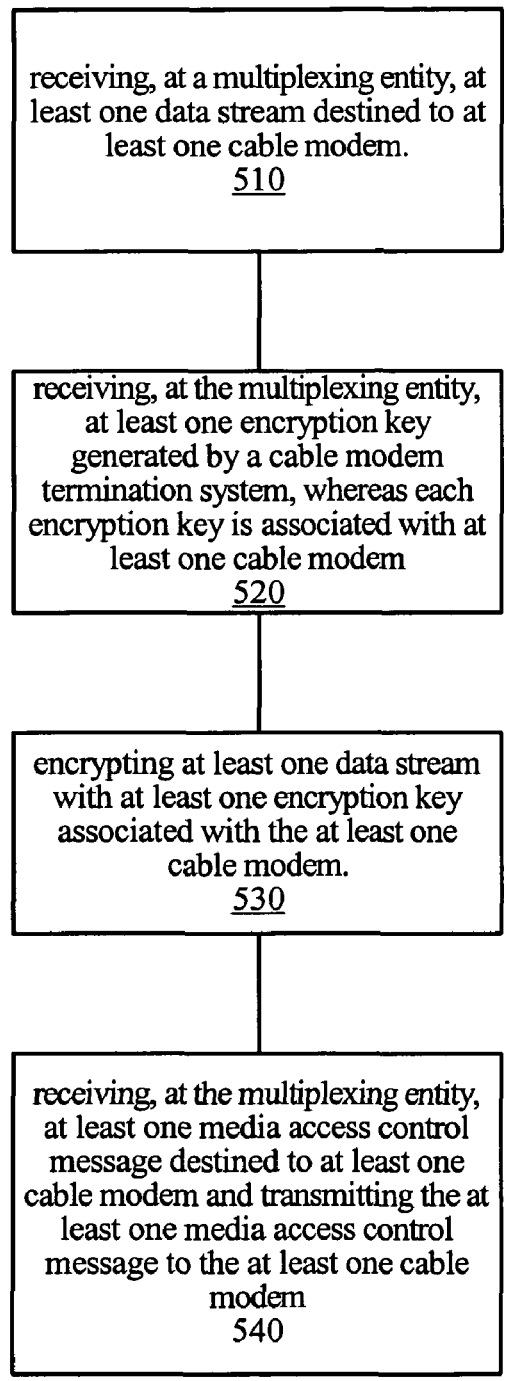
FIG. 8 illustrates a method of encrypting a data stream, according to an embodiment of the invention.

FIG. 8 illustrates method 500 of encrypting a data stream, according to an embodiment of the invention.

Method 500 starts by stage 510 of receiving, at a multiplexing entity, at least one data stream destined to at least one cable modem. Referring to FIG. 3 the multiplexing entity can be a PME 200.

Stage 510 can be followed by stage 520 of receiving, at the multiplexing entity, at least one encryption key generated by a cable modem termination system, whereas each encryption key is associated with at least one cable modem. It is noted that stage 520 can be preceded by stage 510, especially as many data streams can be encrypted by the same encryption key.

Stage 520 is followed by stage 530 of encrypting at least one data stream with at least one encryption key associated with the at least one cable modem. Referring again to FIG. 3, PME 200 and especially a stream processor of PME 200 can perform the encryption.

Method 500 can also include stage 540 of receiving, at the multiplexing entity, at least one media access control message destined to at least one cable modem and transmitting the at least one media access control message to the at least one cable modem. It is noted that stage 530 is illustrated as preceding stage 540 but this is not necessarily so.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

I claim:

1. A method for synchronizing cable modems and encrypting a data stream, the method comprising the stages of:
   generating, at a media access control (MAC) enabled entity, synchronization messages;
   evaluating, by a processing and multiplexing entity, delays between receptions of the synchronization messages and transmissions, towards a transmitter, of updated synchronization messages;
   updating, at the processing and multiplexing entity, the synchronization messages to provide updated synchronization messages, whereas said updating is responsive to the evaluated delays;
   receiving, at the processing and multiplexing entity, at least one data stream destined to at least one cable modem and receiving encryption key provision messages that comprise encryption keys generated by the MAC enabled entity, whereas each encryption key is associated with at least one cable modem; wherein each encryption key provision message further comprises a sequence number field that has a unique value for each encryption session, a validity field that indicates whether the encryption key is valid, a MAC address field that includes a MAC address of one or more cable modems that are associated with the encryption key, and a key remaining lifetime indicative of a remaining lifetime of the encryption key;
   sending, by the processing and multiplexing entity, a key acknowledgement message that comprises a validity field, a MAC address field and a status field; and
   encrypting, by the processing and multiplexing entity, the at least one data stream with the at least one encryption key associated with the at least one cable modem;
   wherein the encryption key and the synchronization messages are sent from the MAC enabled entity to the processing and multiplexing entity over a network; and
   wherein at least a portion of additional content is encrypted with the encryption key that is associated with the at least one cable modem.

2. The method of claim 1 further comprising a stage of downstream transmitting, over the network, a multiplexed signal to the cable modems.

3. The method of claim 1 further comprising generating upstream allocation messages and transmitting them to the cable modems.

4. The method of claim 1 further comprising allocating different MAC sub-layer domains to different cable modems.

5. The method of claim 1 further comprising a stage of synchronizing the cable modems in response to the synchronization messages.

6. The method of claim 1 whereas the synchronization messages are DOCSIS compliant.

7. The method of claim 1 whereas the stage of updating is executed by the processing and multiplexing entity, that is coupled over at least one link to the MAC enabled entity.

8. The method of claim 7, wherein the updating is preceded by evaluating, by the processing and multiplexing entity, a transmission period in response to at least one status of at least one queue of the processing and multiplexing entity, and wherein the updating is further responsive to a result of the evaluating.

9. The method of claim 1 wherein the additional content comprises media.

10. The method of claim 9 further comprising compressing the media by the processing and multiplexing entity.

11. The method of claim 1 further comprises receiving at least one media stream and multiplexing the at least one media stream and the updated synchronization messages to provide a multiplexed signal.

12. The method of claim 11 further comprising processing the at least one media stream prior to the multiplexing.

13. The method of claim 1 further comprising mapping the cable modems and upstream channels.

14. The method of claim 13 further comprising transmitting media access control messages in response to the mapping.

15. The method of claim 1 further comprising a stage of receiving, at the processing and multiplexing entity, at least one media access control message destined to the at least one cable modem and transmitting the at least one media access control message to the at least one cable modem.

16. The method of claim 1 further comprising receiving, at the processing and multiplexing entity, at least one media stream and multiplexing the at least one media stream with the at least one encrypted data stream.

17. The method of claim 1, wherein the encryption key is associated with the media access control address of the at least one cable modem.

18. The method of claim 1, comprising rate-shaping media streams.

19. A system for synchronizing cable modems, the system comprises:

a media access control (MAC) enabled entity, configured to generate synchronization messages and encryption key provision messages that comprise encryption keys, whereas each encryption key is associated with at least one cable modem; wherein an encryption key provision message further comprises a sequence number field that has a unique value for each encryption session, a validity field that indicates whether the encryption key is valid, a MAC address field that includes a MAC address of one or more cable modems that are associated with the encryption key, and a key remaining lifetime indicative of a remaining lifetime of the encryption key;
and
a processing and multiplexing entity, configured to:
evaluate delays between receptions of the synchronization messages and transmissions, towards a transmitter, of updated synchronization messages;
update the synchronization messages to provide updated synchronization messages, whereas said updating is responsive to the evaluated delays;
receive over a network at least one data stream destined to at least one cable modem and the encryption key provision messages;
send a key acknowledgement message that comprises a validity field, a MAC address field and a status field;
and
encrypt the at least one data stream and at least a portion of additional content—with the at least one encryption key associated with the at least one cable modem.

20. The system of claim 19 whereas the processing and multiplexing entity is coupled to the transmitter for downstream transmission a multiplexed signal over the network to the cable modems.

21. The system of claim 19, wherein the MAC enabled entity is further configured to generate upstream allocation messages and to allocate different MAC sub-layer domains to different cable modems.

22. The system of claim 21 wherein the media access control enabled entity is included within a cable modem termination system.

23. The system of claim 19 wherein the processing and multiplexing entity comprises stream processors.

24. The system of claim 19 wherein the processing and multiplexing entity comprises a broadband multimedia router.

25. The system of claim 19, wherein the MAC enabled entity is further configured to generate at least one media access control message destined to the at least one cable modem.

26. The system of claim 25 wherein the at least one media access control message comprise a synchronization message.

27. The system of claim 19 whereas the processing and multiplexing entity is further configured to receive at least one media stream and to multiplex the at least one media stream with the at least one encrypted data stream.

28. A non-transitory computer readable medium having code embodied therein for causing an electronic device to perform the stages of:
generating, at a media access control (MAC) enabled entity, synchronization messages;
evaluating, by a processing and multiplexing entity, delays between receptions of the synchronization messages and transmissions, towards a transmitter, of updated synchronization messages;
updating, at the processing and multiplexing entity, the synchronization messages to provide updated synchronization messages, whereas said updating is responsive to the evaluated delays;
receiving, at the processing and multiplexing entity, at least one data stream destined to at least one cable modem and receiving encryption key provision messages that comprise encryption keys generated by the MAC enabled entity, whereas each encryption key is associated with at least one cable modem; wherein each encryption key provision message further comprises a sequence number field that has a unique value for each encryption session, a validity field that indicates whether the encryption key is valid, a MAC address field that includes a MAC address of one or more cable modems that are associated with the encryption key, and a key remaining lifetime indicative of a remaining lifetime of the encryption key;
sending, by the processing and multiplexing entity, a key acknowledgement message that comprises a validity field, a MAC address field and a status field;
and
encrypting, by the processing and multiplexing entity, at least one data stream with the at least one encryption key associated with the at least one cable modem;
wherein the encryption key and the synchronization messages are sent from the MAC enabled entity to the processing and multiplexing entity over a network; and
wherein at least a portion of additional content is encrypted with the encryption key that is associated with at least one cable modem.

29. The non-transitory computer readable medium of claim 28 whereas the stages further comprise a stage of receiving, at the processing and multiplexing entity, at least one media access control message destined to the at least one cable modem and transmitting the at least one media access control message to the at least one cable modem.

30. The non-transitory computer readable medium of claim 28 whereas the stages further comprise a stage of receiving, at the processing and multiplexing entity, at least one media stream and multiplexing the at least one media stream with the at least one encrypted data stream.

31. The non-transitory computer readable medium of claim 28 wherein the stages further comprise a stage of downstream transmitting, over a network, a multiplexed signal to the cable modems.

32. The non-transitory computer readable medium of claim 28 wherein the stages further comprise a stage of generating upstream allocation messages and transmitting them to the cable modems.

* * * * *